United States Patent
Dzafic

(10) Patent No.: US 10,073,480 B2
(45) Date of Patent: Sep. 11, 2018

(54) POWER DISTRIBUTION NETWORK AND METHOD FOR OPERATION THEREOF

(71) Applicant: SIEMENS AKTIENGESELLSCHAFT, Munich (DE)

(72) Inventor: Izudin Dzafic, Sarajevo (BA)

(73) Assignee: Siemens Aktiengesellschaft, Munich (DE)

( * ) Notice: Subject to any disclaimer, the term of this patent is extended or adjusted under 35 U.S.C. 154(b) by 279 days.

(21) Appl. No.: 14/892,889

(22) PCT Filed: May 24, 2013

(86) PCT No.: PCT/EP2013/060712
§ 371 (c)(1),
(2) Date: Nov. 20, 2015

(87) PCT Pub. No.: WO2014/187501
PCT Pub. Date: Nov. 27, 2014

(65) Prior Publication Data
US 2016/0170426 A1    Jun. 16, 2016

(51) Int. Cl.
*G05B 15/02* (2006.01)
*G05F 1/66* (2006.01)
(Continued)

(52) U.S. Cl.
CPC ............... *G05F 1/66* (2013.01); *G05B 15/02* (2013.01); *G06Q 50/06* (2013.01); *H02J 3/06* (2013.01);
(Continued)

(58) Field of Classification Search
CPC . G05B 15/02; G05F 1/66; G06Q 50/06; H02J 2003/007; H02J 3/06; H02J 3/14;
(Continued)

(56) References Cited

U.S. PATENT DOCUMENTS 5,327,355 A * 7/1994 Chiba ................ G05B 13/0275
700/298
2001/0048375 A1* 12/2001 Maruyama ........... H01H 1/0015
340/870.11

(Continued)

FOREIGN PATENT DOCUMENTS

EP          0495590 A2     7/1992
WO       2012139656 A1    10/2012

*Primary Examiner* — Yuhui R Pan
(74) *Attorney, Agent, or Firm* — Laurence Greenberg; Werner Stemer; Ralph Locher

(57) ABSTRACT

A method for operating an energy distribution network where the energy distribution is monitored by at least one control device. In order to optimize the operating state of the energy distribution network, modification actions are implemented with the aim of improving the operating state of the energy distribution network. Prior to implementing a modification action, the control device verifies whether the extent of improvement in the operating state of the energy distribution network outweighs the extent of wastage from the energy distribution network caused by the implementation of the modification action, and only implements the modification action when this is the case.

12 Claims, 2 Drawing Sheets

(51) Int. Cl.
  *G06Q 50/06* (2012.01)
  *H02J 3/06* (2006.01)
  *H02J 3/16* (2006.01)
  *H02J 3/14* (2006.01)
  *H02J 3/00* (2006.01)

(52) U.S. Cl.
  CPC . *H02J 3/16* (2013.01); *H02J 3/14* (2013.01); *H02J 2003/007* (2013.01); *Y02E 40/34* (2013.01); *Y02E 40/76* (2013.01); *Y02E 60/76* (2013.01); *Y04S 10/54* (2013.01); *Y04S 10/545* (2013.01); *Y04S 40/22* (2013.01)

(58) Field of Classification Search
  CPC .. H02J 3/16; Y02E 40/34; Y02E 40/76; Y02E 60/76; Y04S 10/54; Y04S 10/545; Y04S 40/22
  See application file for complete search history.

(56) References Cited

U.S. PATENT DOCUMENTS

| | | | |
|---|---|---|---|
| 2011/0125337 A1 | 5/2011 | Zavadsky et al. | |
| 2012/0133209 A1* | 5/2012 | O'Brien | H02J 3/1828 307/72 |
| 2013/0030579 A1* | 1/2013 | Milosevic | H02J 3/14 700/286 |

\* cited by examiner

POWER DISTRIBUTION NETWORK AND METHOD FOR OPERATION THEREOF

BACKGROUND OF THE INVENTION

Field of the Invention

The invention relates to a method for operating a power distribution network, in which the distribution of the power is monitored using at least one control device and the operating state of the power distribution network is optimized by performing alteration actions that are intended to improve the operating state of the power distribution network. Such methods of operation are known in the field of power distribution: by way of example, in the event of a short circuit, switches are opened in order to protect the network from overload or destruction.

BRIEF SUMMARY OF THE INVENTION

The invention is based on the object of specifying a method for operating a power distribution network that can be used to achieve reliable operation and the best possible overall state of the power distribution network.

The invention achieves this object by means of a method having the features as claimed. Advantageous embodiments of the method according to the invention are specified in sub claims.

Accordingly, the invention provides for the control device to precede performance of an alteration action with a check to determine whether the extent of the improvement in the operating state of the power distribution network outweighs the extent of the wear on the power distribution network that is caused by the performance of the alteration action, and to perform the alteration action only if this is the case.

A substantial advantage of the method according to the invention can be seen in that the power distribution network can independently reconfigure itself. The suitability that the invention provides for the control device to be able to independently check whether alteration of the network configuration is advantageous means that an optimum network configuration can be achieved quickly and simply in an automated manner.

A further substantial advantage of the method according to the invention is that the check on the issue of whether an alteration action is recommended takes account of the extent of the wear on the power distribution network that is caused by the performance of the alteration action. Alteration actions can therefore be limited to cases in which the respective alteration action actually overcompensates for the wear on the network or the components thereof that is brought about thereby.

The method can be performed particularly simply and hence advantageously when the control device precedes performance of an alteration action with determination of an improvement variable, which indicates the extent of the improvement in the operating state of the power distribution network, and a wear variable, which indicates the wear brought about by the performance of the alteration action.

Preferably, the control device will compare the improvement variable with the wear variable and block the alteration action if the improvement variable is below the wear variable.

It is regarded as particularly advantageous if the control device determines the improvement variable by multiplying an improvement value, which quantitatively indicates the instantaneous operating state improvement that is expected with the alteration action, by a time value, which indicates the period for which the continued existence of the operating state improvement is forecast.

Since alteration of a network normally requires switches to be changed over, the wear on the network when the network is reconfigured or altered will become particularly apparent on the switches. It is therefore regarded as advantageous if the control device precedes performance of an alteration action with ascertainment of all the switches in the power distribution network that need to be changed over for the performance of the alteration action, and determines the wear variable by taking account of the wear on the ascertained switches per switching operation.

Preferably, the control device will ascertain the wear variable by adding the switch individual wear values from the switches involved in the switching operation.

Preferably, the control device will additionally ascertain an unloading variable, which indicates the wear reduction on the power distribution network during further operation that is expected as a result of the alteration action; in such a case, the improvement variable is preferably determined by taking account of the unloading variable.

The actual improvement effect following an alteration can furthermore be compared with the previously expected improvement effect in order to check the quality of the parameters used for performing the method. Accordingly, it is regarded as advantageous if the control device ascertains alteration actions on the basis of parameters that describe the power distribution network and follows performance of an alteration action with a respective check to determine whether the expected improvement in the operating state of the power distribution network has occurred, and produces an error signal, which indicates erroneous parameters, if the expected improvement has not occurred or the extent of the improvement is below a prescribed threshold.

The control device will preferably control the power distribution network on the basis of an active power based control method, particularly what is known as a var method.

The power distribution network is preferably a subnetwork that is associated with a substation and forms part of an overall network. In such a case, it is regarded as advantageous if the control device as part of the substations is operated in an optimization mode in which it optimizes the operation of the subnetwork or of the overall network by performing alteration actions.

The invention additionally relates to a power distribution network having at least one control device for operating the power distribution network, wherein the control device is suitable for controlling the distribution of the power and for optimizing the operating state of the power distribution network by performing alteration actions that are intended to improve the operating state of the power distribution network.

In this regard, the invention provides for the control device to have a computation device that is programmed such that it precedes performance of an alteration action with a check to determine whether the extent of the improvement in the operating state of the power distribution network outweighs the extent of the wear on the power distribution network that is caused by the performance of the alteration action, and performs the alteration action only if this is the case.

It is regarded as advantageous if the power distribution network has at least two substations, which can each supply power to a subnetwork of the power distribution network, and a central device that is super ordinate to the substations.

Preferably, the control device will form a control device for one of the substations or alternatively will form part of the central device.

BRIEF DESCRIPTION OF THE SEVERAL VIEWS OF THE DRAWING

The invention is explained in more detail below on the basis of exemplary embodiments; in this case, by way of example.

In the figures, the same reference symbols are always used for identical or comparable components for the sake of clarity.

DESCRIPTION OF THE INVENTION

Figure 1:
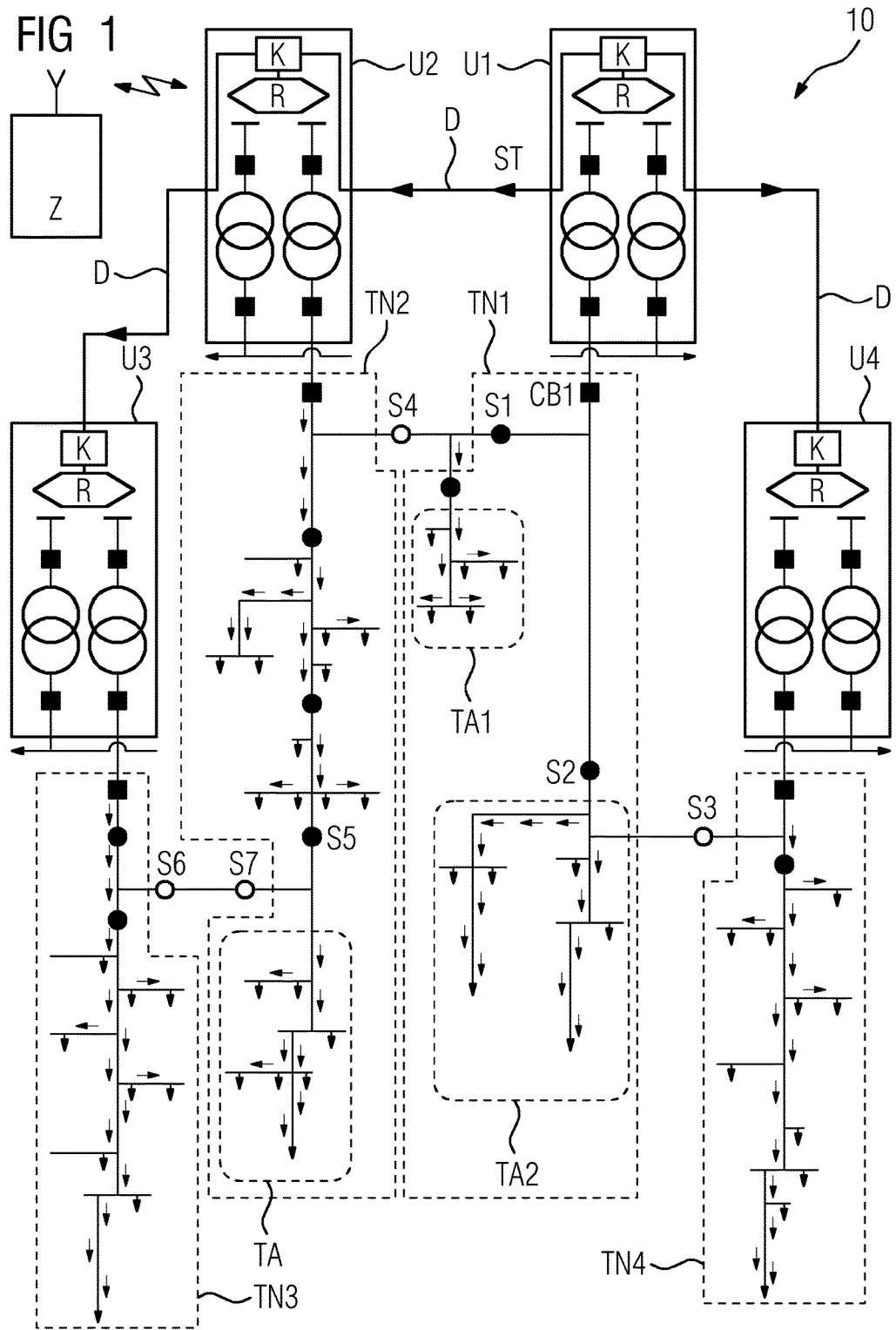
FIG. 1 shows a power distribution network that is used to explain a first exemplary embodiment of the method according to the invention by way of example.

FIG. 1 reveals a power distribution network 10, of which four subnetworks TN1, TN2, TN3 and TN4 are shown in FIG. 1.

The first subnetwork TN1 is supplied with electric power by a substation U1 and has a first subsection TA1 and a second subsection TA2. The two subsections TA1 and TA2 of the first subnetwork TN1 are electrically connected to the substation U1 via switched-on switches CB1, S1 and S2. The switched-on state (represented in the figures by black circles or squares) of the three switches CB1, S1 and S2 means that power from the substation U1 can flow to the two subsections TA1 and TA2 and/or power can be taken from the subsections by the substation U1.

Correspondingly, the subnetworks TN2, TN3 and TN4 are connected to the substations U2, U3 and U4 and can be supplied with power by means of the latter. The subnetworks TN2, TN3 and TN4 or the subsections thereof are connected to one another via switches S3, S4, S5, S6 and S7, inter alia; in the figures, these switches have closed switch states represented by black circles and open switch states represented by white circles.

The four substations U1, U2, U3 and U4 each have a communication device K that allows direct communication with other substations. The communication devices K each have a control device in the form of a computation device R connected to them that is programmed such that it can perform the functions described below. The four substations U1, U2, U3 and U4 are connected to one another via data lines D, which means that they can use these data lines D to interchange data with one another directly. By wire or by radio, the four substations U1, U2, U3 and U4 are additionally connected to a central device Z.

The manner of operation of the power distribution network 10 will now be explained in more detail below on the basis of an exemplary embodiment. In this case, it is assumed by way of example that the substation U1 is operated in an optimization mode in which it optimizes the operation of the subnetwork TN1 and/or of the overall power distribution network 10 by examining an alteration action that the substation U1 could perform in its associated subnetwork TN1 for its effect on the operating state of the subnetwork TN1 and/or of the overall power distribution network 10.

In the state shown in FIG. 1 for the power distribution network 10, the substation U1 supplies power to the two subsections TA1 and TA2 of the subnetwork TN1. As part of the optimization of the operation of the overall power distribution network 10, the substation U1 can check, by way of example, whether reconfiguration of the subnetworks or reassignment of the subsections TA1 and TA2 to subnetworks other than the subnetwork TN1 could bring about an improvement in the overall state of the subnetwork TN1 and/or of the power distribution network 10.

In order to establish this, the substation U1 can first of all check, by way of example, whether or not reassignment of the subsection TA1 to the subnetwork TN2 of the substation U2 would cause an improvement. Such a check can have the following appearance, for example:

First of all, the control device in the form of the computation device R of the substation U1 will precede performance of an alteration action with a check to determine whether the extent of the improvement in the operating state of the subnetwork TN1 and/or of the power distribution network 10 outweighs the extent of the wear on the subnetwork TN1 and/or on the power distribution network 10 that is caused by the performance of the alteration action, and will perform the alteration action only if this is the case.

By way of example, the extent of the improvement in the operating state of the subnetwork TN1 and/or of the power distribution network 10 can be determined as follows:

$$M1 = (Ploss1 - Ploss2)*(t2-t1)*energyPrice(t)$$

where:

M1 specifies an improvement variable, which defines the extent of the improvement in the operating state, Ploss1 specifies the power loss in the power distribution network 10 prior to changeover, Ploss2 specifies the power loss in the power distribution network 10 after changeover, (Ploss1-Ploss2) specifies the difference between the power loss in the subnetwork TN1 and/or the power distribution network 10 prior to changeover and after changeover and hence an instantaneous operating state improvement as a result of the changeover, energyPrice (t) specifies the present energy costs and (t2-t1) specifies a period for which the continued existence of the operating state improvement is forecast.

In the example, the extent of the wear on the subnetwork TN1 and/or on the power distribution network 10 is obtained from the wear on the two switches S1 and S4 that need to be changed over for the reassignment; in this case, it thus holds that:

$$M2 = A1 + A2, \text{ where:}$$

M2 specifies a wear variable, which indicates the wear brought about by the performance of the alteration action, A1 specifies the wear on the switch S1 (e.g. in the form of a monetary loss of value per switching operation) and A2 specifies the wear on the switch S2 (e.g. in the form of a monetary loss of value per switching operation).

As soon as the improvement variable M1 and the wear variable M2 have been ascertained, the computation device R of the substation U1 will check whether the improvement outweighs the wear, that is to say whether the following holds:

$$M1 > M2.$$

If this condition is met, the computation device R of the substation U1 will prompt changeover of the switches S1 and S4 (e.g. by sending a control signal ST to the substation U2).

Preferably, the computation device R of the substation U1 will also check whether the changeover unloads components of the subnetwork TN1 and/or of the power distribution network 10 and will possibly ascertain an unloading variable, which indicates the wear reduction on the power distribution network during further operation that is expected as a result of the alteration action, and will additionally determine the improvement variable M2 by taking account of the unloading variable.

The computation device R of the substation U1 can also follow performance of an alteration action with a respective check to determine whether the expected improvement in the operating state of the subnetwork TN1 and/or of the power distribution network 10 has occurred, and can produce an error signal, which indicates erroneous parameters, if the expected improvement has not occurred or the extent of the improvement is below a prescribed threshold.

Figure 2:
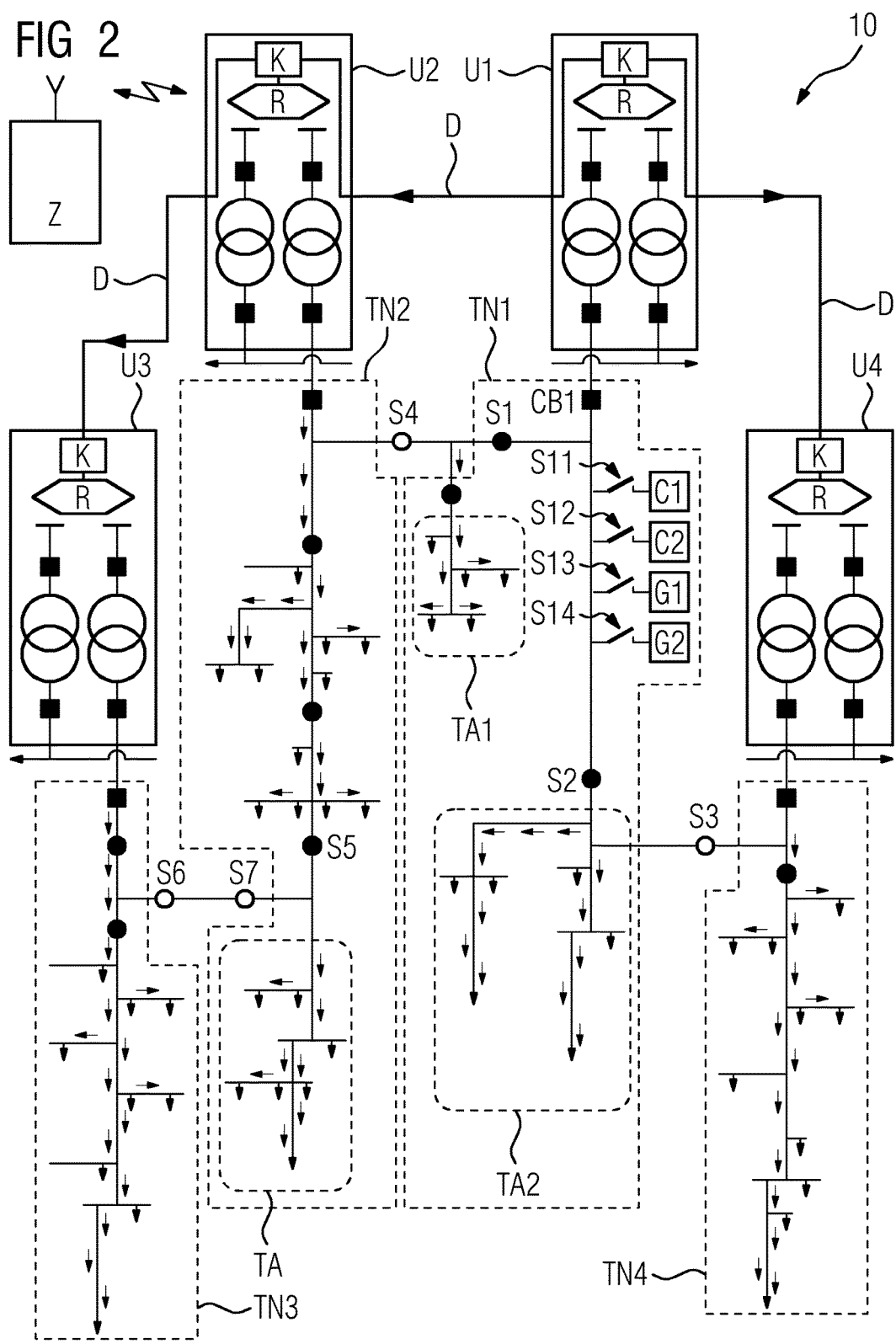
FIG. 2 shows a power distribution network that is used to explain a second exemplary embodiment of the method according to the invention by way of example.

FIG. 2 shows a modified power distribution network 10 in which the subnetwork TN1 additionally contains connectable generators G1 and G2 and connectable capacitive loads C1 and C2. It is subsequently assumed by way of example that the computation device R of the substation U1 controls the subnetwork TN1 on the basis of a VVC method (voltage var method).

If, during operation of its subnetwork TN1, the computation device R of the substation U1 establishes that prescribed network parameters (e.g. maximum voltage fluctuations, maximum frequency fluctuations, maximum reactive power in the network, maximum ratio between reactive power and active power in the network, maximum current carried by the network) are not observed or are not observed to a sufficient extent, then it will examine whether the connection of one of the two generators G1 or G2 or of both generators G1 and G2 and/or the connection of one of two capacitive loads C1 or C2 or of both capacitive loads C1 and C2 prompts the prescribed network parameters to be observed better and an alteration action is worthwhile.

Such an alteration action would relate to the closure of one or more of the switches S11, S12, S13 or S14 and wear them. There would also be wear on the generators G1 and G2 entering operation and/or on the connected capacitive loads C1 and C2.

By way of example, the extent of the improvement in the operating state of the power distribution network can be determined as follows:

$$M1=(\text{network state 2}-\text{network state 1})*(t2-t1)*\text{saving factor }(t)$$

where:

M1 specifies an improvement variable, which defines the extent of the improvement in the operating state, network state 1 specifies a state variable that indicates the network state in the power distribution network 10 prior to changeover, network state 2 specifies a state variable that indicates the network state in the power distribution network 10 after changeover, (network state 2−network state 1) specifies an instantaneous operating state improvement as a result of the changeover, saving factor (t) specifies a factor that is normalized to the degree of operating state improvement and that defines the cost saving obtained (e.g. as a monetary variable) and, (t2−t1) specifies a period for which the continued existence of the operating state improvement is forecast.

By way of example, the cost saving that is taken into account in normalized form in the saving factor (t) can take account of the fact that components of the power distribution network 10 are overloaded and/or are operated in a nonoptimum operating state prior to changeover or prior to alteration of the configuration of the subnetwork TN1 and hence their life is reduced and their operating costs are unnecessarily increased. Additionally or alternatively, the "saving factor (t)" parameter can also take account of fines that the operator of the subnetwork TN1 or of the power distribution network 10 has to pay to its customers for nonobservance of the aforementioned prescribed network parameters on the basis of the degree of discrepancy.

The extent of the wear on the power distribution network 10 as a result of the performance of the alteration action is obtained in the example from the wear on the switches S11 to S14 that need to be changed over and the wear on the connected components during operation, and so in the worst case this would result in:

$$M2=A11+A12+A13+A14+Ag1+Ag2+Ac1+Ac2,$$

wherein:

M2 specifies a wear variable, which indicates the wear brought about by the performance of the alteration action, A11 specifies the wear on the switch S11 during single changeover, A12 specifies the wear on the switch S12 during single changeover, A13 specifies the wear on the switch S13 during single changeover, A14 specifies the wear on the switch S14 during single changeover, Ag1 specifies the wear on the generator G1 during operation in the period t2−t1, Ag2 specifies the wear on the generator G2 during operation in the period t2−t1, Ac1 specifies the wear on the capacitive load C1 during operation in the period t2−t1 and Ac2 specifies the wear on the capacitive load C2 during operation in the period t2−t1.

As an alternative to wear or in addition to wear, the parameters Ag1, Ag2, Ac1 and Ac2 can also take account of the operating costs of the components during operation in the period t2−t1, for example the costs of power generation in the case of the generators and/or the costs of providing the components, for example if they need to be rented from third-party providers.

It goes without saying that determination of the wear variable M2, particularly also when internal or external operating costs are taken into account, needs to take account of only those switches, generators and capacitive loads that are actually changed over or used.

As soon as the improvement variable M1 and the wear variable M2 have been ascertained, the computation device R of the substation U1 will check whether the improvement outweighs the wear, that is to say whether the following holds:

$$M1>M2.$$

If this condition is met, the computation device R of the substation U1 will prompt changeover of one of the switches, of some switches or of all the switches S11 to S14.

It is also possible for the computation device R of the substation U1—as in the case of the exemplary embodiment shown in FIG. 1—to follow performance of an alteration action with a respective check to determine whether the expected improvement in the operating state of the power distribution network has occurred, and to produce an error signal, which indicates erroneous parameters, if the expected improvement has not occurred or the extent of the improvement is below a prescribed threshold.

Although the invention has been illustrated and described in more detail by preferred exemplary embodiments, the invention is not restricted by the disclosed examples and other variations can be derived therefrom by a person skilled in the art without departing from the scope of protection of the invention.

LIST OF REFERENCE SYMBOLS

10 Power distribution network
C1 Capacitive load
C2 Capacitive load
CB1 Switch
D Data line
G1 Generator
G2 Generator
K Communication device
R Computation device
S1-S7 Switch
S11-S14 Switch
ST Control signal
TA1 Subsection
TA2 Subsection
TN1 Subnetwork
TN2 Subnetwork
TN3 Subnetwork
TN4 Subnetwork
U1 Substation
U2 Substation
U3 Substation
U4 Substation
Z Central device

The invention claimed is:

1. A method of operating a power distribution network, the method comprising:
monitoring a distribution of power with at least one control device and optimizing an operating state of the power distribution network by performing alteration actions intended to improve the operating state of the power distribution network;
prior to performing an alteration action, checking with the control device to determine whether an extent of an improvement in the operating state of the power distribution network outweighs an extent of wear on the power distribution network that would be caused by performing the alteration action;
determining an improvement variable and a wear variable with the control device before performing an alteration action, the improvement variable indicating an extent of the improvement in the operating state of the power distribution network and the wear variable indicating the wear brought about by performing the alteration action;
comparing with the control device the improvement variable with the wear variable and blocking the alteration action if the improvement variable is below the wear variable; and
performing the alteration action only if the improvement in the operating state outweighs the extent of wear on the power distribution network.

2. The method according to claim 1, which comprises determining the improvement variable by multiplying an improvement value, which quantitatively indicates an instantaneous operating state improvement that is expected with the alteration action, by a time value, which indicates a period for which a continued existence of the operating state improvement is forecast.

3. The method according to claim 1, which comprises, before performing an alteration action:
ascertaining with the control device all switches in the power distribution network that need to be changed over for performing the alteration action; and
determining the wear variable by taking account of the wear on the switches that need to be changed over per switching operation.

4. The method according to claim 1, which comprises:
ascertaining an unloading variable with the control device, the unloading variable indicating a wear reduction on the power distribution network during further operation that is expected as a result of the alteration action; and
determining the improvement variable by taking account of the unloading variable.

5. The method according to claim 1, wherein the control device:
ascertains alteration actions based on parameters that describe the power distribution network and follows performance of an alteration action with a respective check to determine whether an expected improvement in the operating state of the power distribution network has occurred; and
produces an error signal indicating erroneous parameters if the expected improvement has not occurred or the extent of the improvement lies below a prescribed threshold.

6. The method according to claim 1, which comprises controlling the power distribution network with the control device using a volt-ampere-reactive method.

7. The method according to claim 1, wherein:
the power distribution network is a subnetwork associated with a substation and forming a part of an overall network; and
the control device as part of the substations is operated in an optimization mode in which the control device optimizes an operation of the subnetwork or of the overall network by performing alteration actions.

8. A power distribution network, comprising:
at least one control device for operating the power distribution network, said control device being configured for controlling a distribution of power and for optimizing an operating state of the power distribution network by performing alteration actions intended to improve the operating state of the power distribution network;
said control device having a computation device programmed to precede a performance of an alteration action with a check to determine whether an extent of an improvement in the operating state of the power distribution network outweighs an extent of wear on the power distribution network that would be caused by performing the alteration action, and to perform the alteration action only if the improvement in the operating state outweighs the extent of wear on the power distribution network;
said computation device being programmed to determine an improvement variable and a wear variable before performing an alteration action, the improvement variable indicating an extent of the improvement in the operating state of the power distribution network and the wear variable indicating a wear brought about by performing the alteration action, and to compare the improvement variable with the wear variable; and said control device being configured to block the alteration action if the improvement variable lies below the wear variable.

9. The power distribution network according to claim 8, which comprises at least two substations each configured to supply power to a subnetwork of the power distribution network, and a central device that is super-ordinate to said substations.

10. The power distribution network according to claim 9, wherein said control device is a control device for one of said substations.

11. The power distribution network according to claim 9, wherein said control device forms part of said central device.

12. A method of operating a power distribution network, the method comprising:
monitoring a distribution of power with at least one control device and optimizing an operating state of the power distribution network by performing alteration actions intended to improve the operating state of the power distribution network;
prior to performing an alteration action:
checking with the control device to determine whether an extent of an improvement in the operating state of the power distribution network outweighs an extent of wear on the power distribution network that would be caused by performing the alteration action;
ascertaining with the control device all switches in the power distribution network that need to be changed over for performing the alteration action;
determining an improvement variable with the control device, the improvement variable indicating an extent of the improvement in the operating state of the power distribution network;
determining a wear variable indicating the wear brought about by performing the alteration action by taking account of the wear on the switches that need to be changed over per switching operation by adding switch individual wear values from the switches involved in the switching operation; and
performing the alteration action only if the improvement in the operating state outweighs the extent of wear on the power distribution network.

\* \* \* \* \*